United States Patent
Hamilton et al.

(10) Patent No.: US 7,805,226 B2
(45) Date of Patent: Sep. 28, 2010

(54) HIERARCHICAL STRATEGY FOR SINGULARITY AVOIDANCE IN ARRAYS OF CONTROL MOMENT GYROSCOPES

(75) Inventors: Brian J. Hamilton, Glendale, AZ (US); Brian K. Underhill, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1033 days.

(21) Appl. No.: 11/540,452

(22) Filed: Sep. 29, 2006

(65) Prior Publication Data

US 2008/0105787 A1    May 8, 2008

(51) Int. Cl.
*B64G 1/36* (2006.01)

(52) U.S. Cl. ............ 701/13; 701/1; 701/3; 701/4; 701/226; 74/5 R; 74/5.34; 74/5.4; 244/158.1; 244/164; 244/165

(58) Field of Classification Search ............ None
See application file for complete search history.

(56) References Cited

U.S. PATENT DOCUMENTS

| | | | | |
|---|---|---|---|---|
| 5,269,483 | A * | 12/1993 | Flament | 244/164 |
| 5,875,676 | A * | 3/1999 | Bailey et al. | 74/5.22 |
| 6,039,290 | A | 3/2000 | Wie et al. | |
| 6,047,927 | A * | 4/2000 | Heiberg et al. | 244/165 |
| 6,128,556 | A * | 10/2000 | Bailey | 701/13 |
| 6,131,056 | A * | 10/2000 | Bailey et al. | 701/13 |
| 6,154,691 | A * | 11/2000 | Bailey | 701/13 |
| 6,260,805 | B1 * | 7/2001 | Yocum et al. | 244/164 |
| 6,305,647 | B1 * | 10/2001 | Defendini et al. | 244/165 |
| 6,354,163 | B1 | 3/2002 | Heiberg | |
| 6,648,274 | B1 * | 11/2003 | Bailey et al. | 244/165 |
| 6,681,649 | B2 * | 1/2004 | Hyde et al. | 74/5.47 |
| 6,917,862 | B2 * | 7/2005 | Wie | 701/13 |
| 7,014,150 | B2 * | 3/2006 | Peck et al. | 244/165 |
| 7,171,290 | B2 * | 1/2007 | Lagadec et al. | 701/13 |
| 7,370,833 | B2 * | 5/2008 | Johnson et al. | 244/165 |

(Continued)

FOREIGN PATENT DOCUMENTS

WO    WO 03/001311    1/2003

(Continued)

OTHER PUBLICATIONS

Kuhns, et al., "A preferred trajectory tracking steering law for spacecraft with redundant CMGs," Proceedings of American Control Conference, 1995, pp. 3111-3115, vol. 5.

(Continued)

*Primary Examiner*—Khoi Tran
*Assistant Examiner*—Jonathan Sample
(74) *Attorney, Agent, or Firm*—Ingrassia Fisher & Lorenz, P.C.

(57) ABSTRACT

A control system for adjusting the attitude of a spacecraft comprises a set of control moment gyroscopes (CMGs) configured to allow null space maneuvering. The control system further comprises a momentum actuator control processor coupled to the set of CMGs and configured to determine a mandatory null space maneuver to avoid singularities and determine an optional null space maneuver to increase available torque. The mandatory null space maneuver can be calculated based upon certain gimbal angles, and can be implemented by augmenting the inverse-Jacobian control matrix.

17 Claims, 8 Drawing Sheets

U.S. PATENT DOCUMENTS

2004/0111194 A1* 6/2004 Wie .......................... 701/13
2006/0027708 A1* 2/2006 Peck et al. ................. 244/165
2008/0035797 A1* 2/2008 Defendini et al. ......... 244/165

FOREIGN PATENT DOCUMENTS

| WO | WO 2004/032392 | 4/2004 |
| WO | 2006020314 | 2/2006 |
| WO | PCT/US2005/025614 | 7/2006 |
| WO | 2006085996 | 8/2006 |

OTHER PUBLICATIONS

European Search Report for Application No. EP 07117311, mailed on Dec. 3, 2007.

* cited by examiner

HIERARCHICAL STRATEGY FOR SINGULARITY AVOIDANCE IN ARRAYS OF CONTROL MOMENT GYROSCOPES

FIELD OF THE INVENTION

This invention relates to the field of spacecraft vehicle control and, more specifically, to a hierarchical strategy for singularity avoidance in arrays of control moment gyroscopes.

BACKGROUND OF THE INVENTION

In order to control the attitude of a spacecraft, various rotating inertia members can be used. One such inertia member is a control moment gyroscope (CMG). A CMG typically comprises a flywheel with a fixed or variable spin rate mounted to a gimbal assembly. The spin axis of the CMG can be tilted by moving the CMG using the gimbal assembly. This motion produces a gyroscopic torque orthogonal to the spin axis and gimbal axis.

To achieve full attitude control of a spacecraft, a minimum of three CMGs, arranged such that each CMG in the CMG array imparts torque about a linearly independent axis, can be used. Typically, additional CMGs are provided for redundancy purposes and to help avoid singularities. A singularity occurs when the momentum vectors of the CMGs line up such that one or more components of the requested torque can not be provided. The CMGs are moved about their gimbal axes in response to a torque command.

A Jacobian, C, maps the CMG gimbal rates into a three dimensional array torque:

$$C\omega = \tau \qquad \text{Eqn. 1}$$

where C is a 3×n Jacobian matrix, $\omega$ is a n1× array of gimbal rates for the n gimbals, and $\tau$ is a 3×1 array of torque components to be imparted to the spacecraft. Using the above equation with a known torque command, $\tau$, the individual gimbal rates for each CMG can be calculated. Using the well-known Moore-Penrose pseudoinverse to invert the Jacobian matrix, a set of possible gimbal rates is:

$$\omega = C^T (CC^T)^{-1} \tau \qquad \text{Eqn. 2}$$

As discussed previously, inherent in the use of CMGs is the possibility that the CMGs' momentum vectors may line up in such a way that a singularity condition is reached. Mathematically, singularities can occur when the eigenvalues of $CC^T$ approach zero, causing $(CC^T)^{-1}$ to go to infinity. Or, equivalently, singularities occur when the determinant of the matrix $CC^T$ is equal to zero (expressed algebraically as $\det(CC^T)=0$). In the case of a 3×n matrix C, this is equivalent to saying the rank of the matrix is two or less.

Different approaches have been devised to avoid singularities in the movement of CMGs. In one approach, referred to as the "singularity robust" inverse, to ensure that $(CC^T)^{-1}$ never is 0, $(CC^T)^{-1}$ is replaced by $(CC^T+\epsilon I)^{-1}$ where I is the identity matrix and $\epsilon$ is a small number. The use of a positive $\epsilon$ ensures that $\det(CC^T+\epsilon I)^{-1}$ never becomes 0.

While useful in some instances, a drawback to this approach is that this approach changes the gimbal rate calculation. In the case of the Jacobian, C, the pseudoinverse no longer exactly maps gimbal rates into the commanded torques because of the error it introduces. This resulting error steers the spacecraft in the wrong direction and can introduce significant, undesired torque, especially near a singularity.

A second approach is to limit the CMG array's momentum to a smaller volume within the CMG array's overall momentum envelope. The momentum envelope is the momentum provided in all possible combinations of the CMGs in the CMG array. By operating in a subvolume in which no singularities exist, singularities can be avoided. However, this approach wastes potential momentum and results in systems that are larger and heavier than needed.

As discussed previously, in order to achieve full attitude control of a spacecraft, a minimum of three CMGs are required. In general, a non-symmetrical array of N CMGs, each of whose gimbal angle is independently controlled, has N degrees of freedom. Thus, for an object in orbit, a minimum of three CMGs are needed to provide a full three degrees of freedom. In an exemplary embodiment when exactly three CMGs are used, every point in momentum space in the XYZ coordinate system can be reached by one, and only one set of gimbal angles.

The addition of one or more CMGs adds additional degrees of freedom to the system above what is necessary for full attitude control. This results in what is known as null space. With the addition of null space, each point in momentum space in the XYZ coordinate system can be mapped to an indefinite number of gimbal angles. This can be used to provide a requested torque while also avoiding singularities.

While null space can be used to avoid singularities, null motions use gimbal rate that might otherwise be available for torque production. Therefore, the tasks of avoiding singularities and maximizing available torque can be mutually exclusive.

Accordingly, it is desired to provide a hierarchical strategy for singularity avoidance in arrays of control moment gyroscopes. Furthermore, the desirable features and characteristics of the present invention will be apparent from the subsequent detailed description and the appended claims, taken in conjunction with the accompanying drawings and the foregoing technical field and background.

SUMMARY OF THE INVENTION

In an exemplary embodiment, a method for avoiding singularities in the movement of a set of control moment gyroscopes (CMGs) that includes at least one additional CMG (resulting in null space) includes a hierarchical two-step process. The first step is determining a mandatory null space maneuver to avoid singularities that must be applied even at the expense of torque production. Next, an optional null space maneuver to increase available torque is determined, but applied only to the extent torque allows.

In an exemplary embodiment, a method for avoiding singularities as above in which the mandatory null space maneuver is computed based upon a quantity directly related to gimbal angle, specifically the number of degrees a keepout zone is violated.

In an exemplary embodiment, a method for avoiding singularities as above in which the mandatory null space maneuver is implemented by modifying the inverse-Jacobian control matrix.

BRIEF DESCRIPTION OF THE DRAWINGS

The present invention will hereinafter be described in conjunction with the following drawing figures, wherein like numerals denote like elements, and.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following discussion a set of CMGs configured to allow null-space maneuvering is a set of CMGs that has at least one additional CMG above what is required to provide the n-degrees of freedom needed for maneuvering in N-space. Four or more CMGs are required in an array designed for maneuvering in three-dimensional space.

The following detailed description describes the use of the present invention in terms of its use in an exemplary CMG array singularity avoidance system. However, applications of the present invention are not limited to any one specific application or embodiment, but are useful in many different areas of endeavor.

Figure 1:
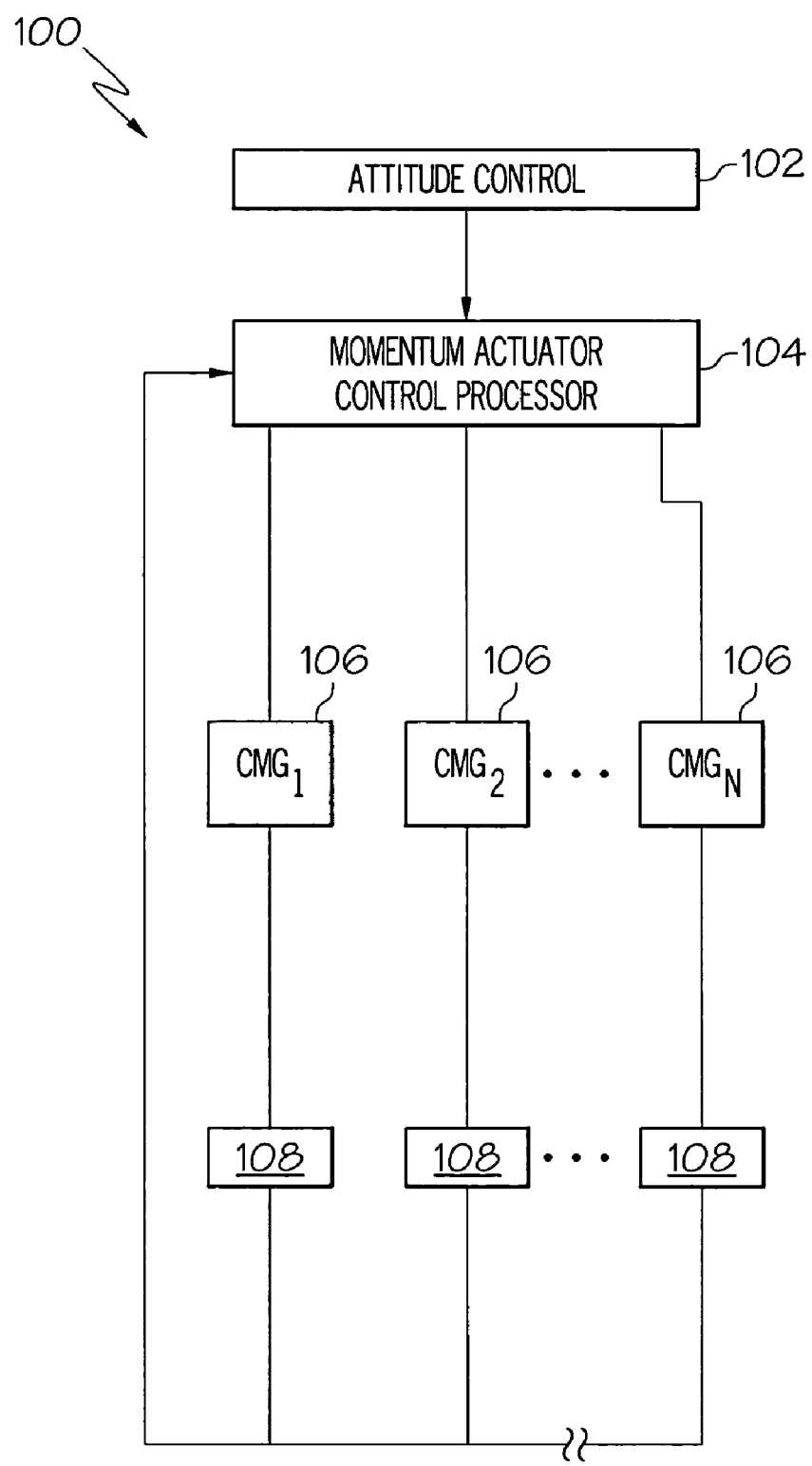
FIG. 1 is a block diagram illustrating an exemplary CMG control system in accordance with the teachings of the present invention.

An exemplary control system 100 for implementing the present invention is illustrated in FIG. 1. The components of the control system 100 are known in the art and can be assembled in different ways using different processors, software, controllers, sensors and the like. Additionally, various computational functionalities that are typically provided by one part of the system can instead be provided by another part or parts. The system 100 as shown in FIG. 1 illustrates parts that are pertinent to the discussion of the present invention only and may not include other elements or systems that can be provided in a control system and which are well known.

The control system 100 includes an attitude control system 102 coupled to a momentum actuator control processor 104. CMGs 106 are coupled to the momentum actuator control processor 104. Associated with each CMG 106 are one or more CMG sensors 108 for providing information concerning the state of the CMG 106 to the control system 100. Control system 100, in one embodiment, is mounted on a spacecraft such as an orbiting satellite.

Attitude control system 102 controls the positioning of a spacecraft. The attitude control system 102 receives data concerning a desired spacecraft maneuver and determines an appropriate torque command to complete the desired maneuver. The torque commands can be presented to the momentum actuator control processor 104. The momentum actuator control processor 104, in response to the torque commands, can calculate the gimbal rates necessary to produce the commanded torque.

The momentum actuator control processor 104, based on the above identified calculations, provides the necessary commands to the CMGs 106 such that the CMG 106 movement produces the commanded torque and, in accordance with the teachings of the present invention, provides the torque while avoiding singularities by using null space maneuvering.

Figure 2:
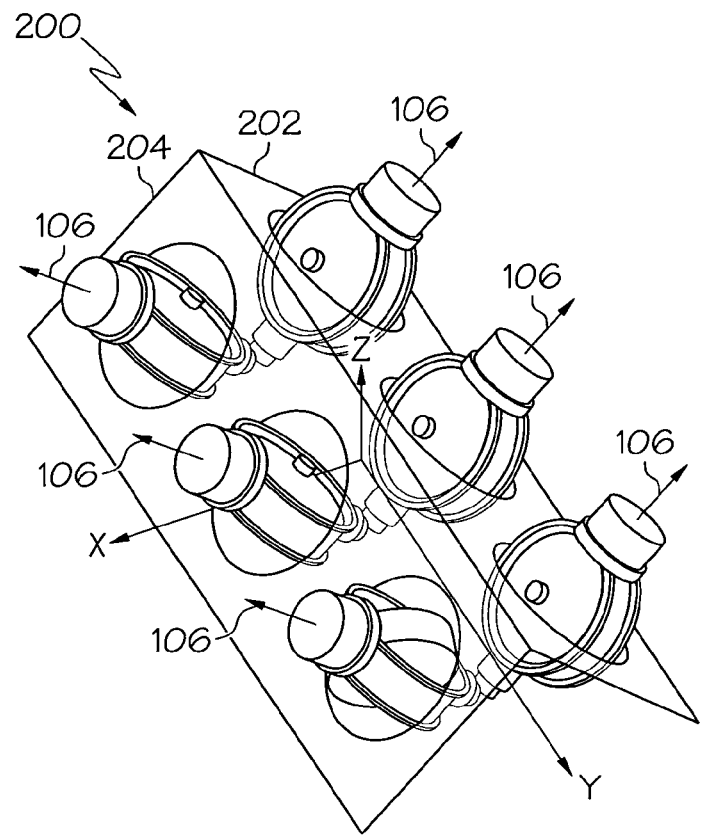
FIG. 2 is an exemplary embodiment of an array of CMGs arranged in a "roof" array geometry in accordance with the teachings of the present invention.

FIG. 2 illustrates an exemplary embodiment of an array 200 of CMGs 106 arranged in what is known as "roof" array geometry. In this geometry, the CMGs 106 are split into a first group 202 and a second group 204. The first group 202 and second group 204 of CMGs 106 are nominally at right angles.

If the largest momentum magnitude of any CMG 106 in a parallel set of CMGs 106 is less than or equal to the sum of the momentum magnitudes of all other CMGs 106, the total momentum of that set of parallel CMGs 106 will be a disk, otherwise the total momentum will be an annulus. In FIG. 2, it is assumed each CMG 106 provides the same momentum. Therefore, the net momentum for first group 202 and second group 204 will be in a disk.

Figure 3:
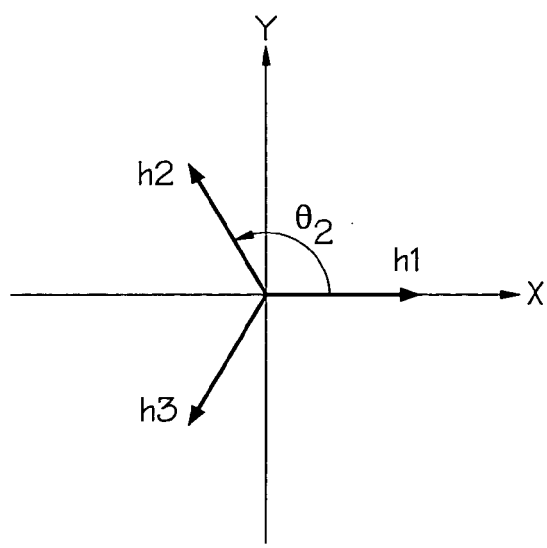
FIG. 3 illustrates an exemplary embodiment of momentum vectors of three parallel CMGs in accordance with the teachings of the present invention.

In the example of FIG. 2, three CMGs 106 with parallel gimbal axes and equal momentum magnitudes in either the first group 202 or the second group 204 sweep out a momentum disc of radius 3 h, where h is the momentum provided by a single CMG 106. FIG. 3 illustrates the three momentum vectors, $h_1$, $h_2$, and $h_3$ of three parallel CMGs 106. The array of CMGs 106 is shown in an initial zero-momentum state. By rotating the three gimbals, independent control over the net momentum vector in the X and Y directions can be achieved.

Note that in the example of FIG. 3, each of the groups of CMGs 106 in either first group 202 or the second group 204 includes three CMGs 106 and, therefore, three degrees of freedom. This provides, for each group, two degrees of freedom in the momentum disk and an additional degree of freedom for null space maneuvering.

Figure 4A:
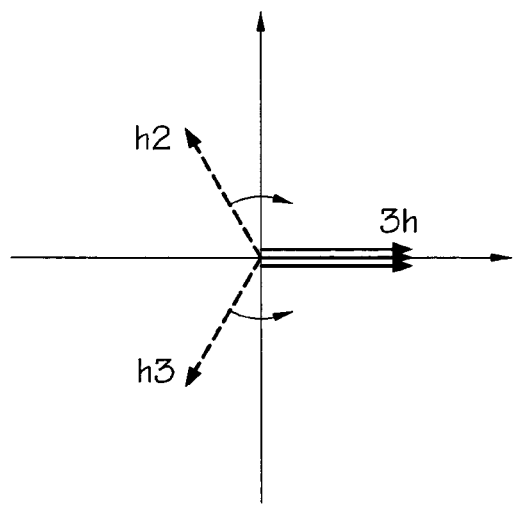
FIG. 4a illustrates an exemplary embodiment of a configuration of momentum vectors producing a maximum momentum in the X-direction in accordance with the teachings of the present invention.
Figure 4B:
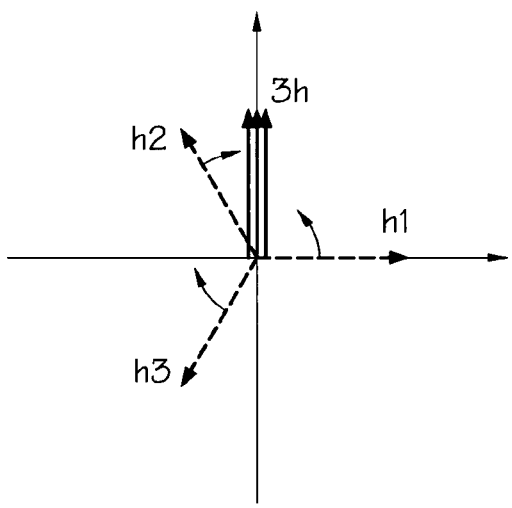
FIG. 4b illustrates an exemplary embodiment of a configuration of momentum vectors producing a maximum momentum of 3 h in the Y-direction in accordance with the teachings of the present invention.

FIG. 4a illustrates the alignment momentum of each vector, $h_i$, for each CMG 106 to produce a maximum momentum of 3 h in the X-direction. In FIG. 4a, the second momentum vector, $h_2$, and the third momentum vector, $h_3$, are rotated to the X-axis. FIG. 4b illustrates a maximum momentum of 3 h in the Y-direction. In FIG. 4b, the first momentum vector, $h_1$, the second momentum vector, $h_2$, and the third momentum vector, $h_3$, are rotated towards the Y-axis to produce a total momentum of 3 h in the Y-direction.

Therefore, the three CMGs 106 can combine to produce a total momentum of 3 h in a desired direction. For the exemplary embodiment where all three CMGs 106 produce the same amount of momentum, the maximum momentum is 3 h, which is located in a 3 h circle about the origin. When the array of three CMGs 106 reaches the 3 h momentum state, it is impossible to increase the momentum any further. Technically, this condition produces a singularity, but is typically referred to as the "saturation" singularity. To avoid control difficulties that arise as the saturation singularity is approached, a margin between the saturation momentum and the momentum allowed should be provided.

Figure 5:
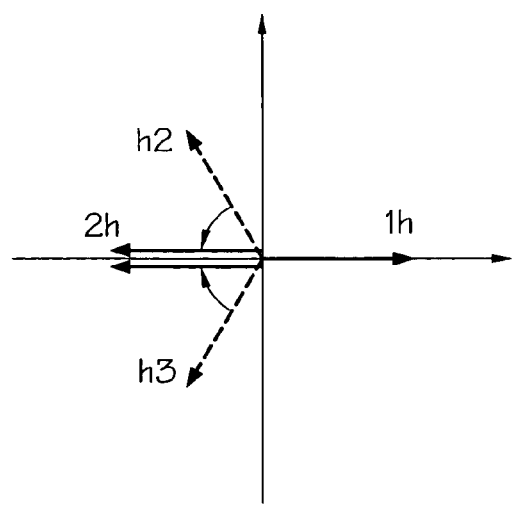
FIG. 5 illustrates an exemplary embodiment of a singular CMG alignment in accordance with the teachings of the present invention.

Another exemplary embodiment of CMG 106 alignment is illustrated in FIG. 5, where a command is given to the CMGs 106 to produce a maximum net momentum in the negative X direction (to the left of the origin). In one exemplary system, utilizing a control law that follows Eqn. 2 to determine gimbal rates, the CMGs 106 that produce the momentum vectors $h_2$ and $h_3$ would be moved in the correct direction, but since $$\frac{\partial h_X}{\partial \theta_1} = 0,$$

the controller would deduce that there was no value in moving the CMG 106 corresponding to the momentum vector, $h_1$. The net momentum of the three CMGs 106 is now only 1 h in magnitude and there is no way to produce any more momentum without producing an error in the Y-axis. Specifically, there is no small change in gimbal angles that can produce a small increase in momentum in the desired direction. This is called an "internal" singularity.

Figure 6A:
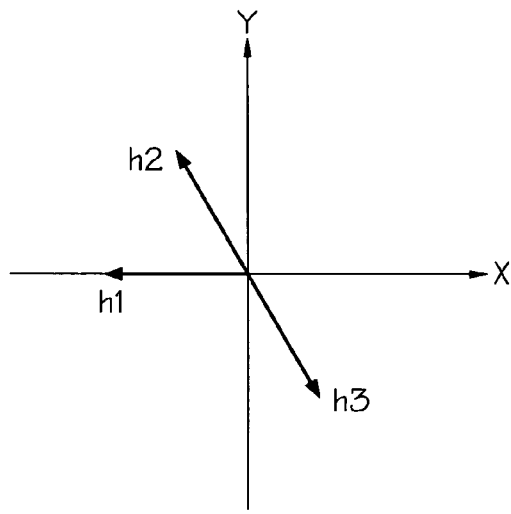
FIGS. 6a, 6b and 6c illustrate different exemplary configurations of momentum vectors that combine to form a net momentum of 1 h in the negative X direction in accordance with the teachings of the present invention.
Figure 6B:
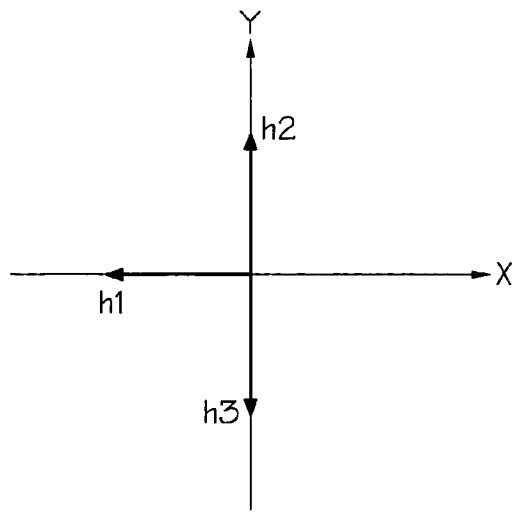
Figure 6C:
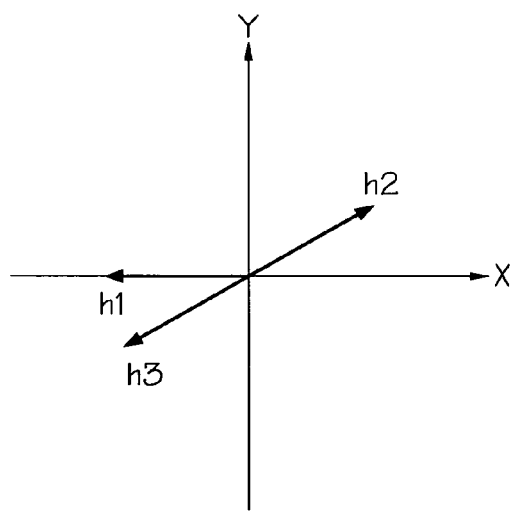

Thus, three parallel CMGs 106 have an internal singularity circle at radius 1 h. Every point on the circle has the potential of being a singular point like the one described above. However, it is possible to cross the 1 h circle by choosing the correct position of the CMGs 106 in null space. For example, using null space, there is more than one CMG 106 configuration that can produce a selected momentum, H. In FIG. 6a, 6b and 6c different configurations of the CMGs 106 momentum vectors are illustrated that combine to form a net momentum of 1 h in the negative X direction. Note that in all solutions for this net momentum the momentum vector of one CMG 106 is at 180 degrees from the positive X-axis and the other two momentum vectors for the other two CMGs 106 are aligned such that they cancel out. The null space available at this point can be used to rotate the two CMGs 106 whose momentum vectors cancel out. If they are rotated so they align with the X-axis, a singularity results. Maximum distance from a singularity occurs when they are aligned with the Y-axis, as seen in FIG. 6b.

Figure 7:
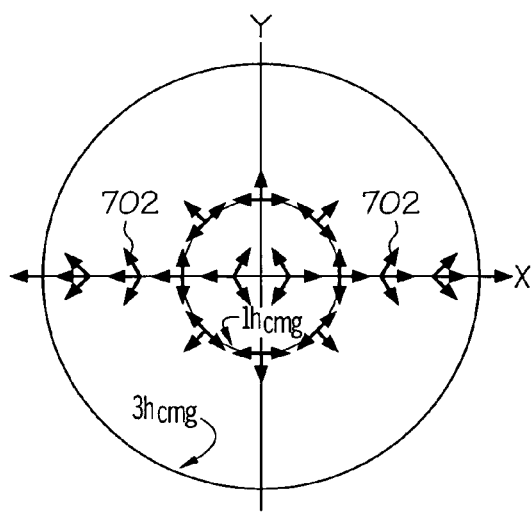
FIG. 7 illustrates an exemplary embodiment of various ideal momentum vector combinations in accordance with the teachings of the present invention.

From this, it can be concluded that the ideal gimbal angles for crossing the 1 h circle are when one momentum vector of one CMG 106 is aligned radially outward at that point (i.e., in the direction of the desired momentum), and the other two momentum vectors are tangential to the circle. If the two opposing CMGs 106 do not quite reach the tangential position but are opposing, the correct net H will be achieved but the system will not be maximally distant from a singularity. FIG. 7 illustrates various ideal combinations of momentum vectors 702. Note that in FIG. 7, there is a discontinuity at the origin as the radially aligned CMG 106 momentum vector switches from the X to the –X direction. Thus, it would not be possible to define a simple fixed mapping from momentum space to gimbal space. Instead, null space must be "navigated".

Figure 8:
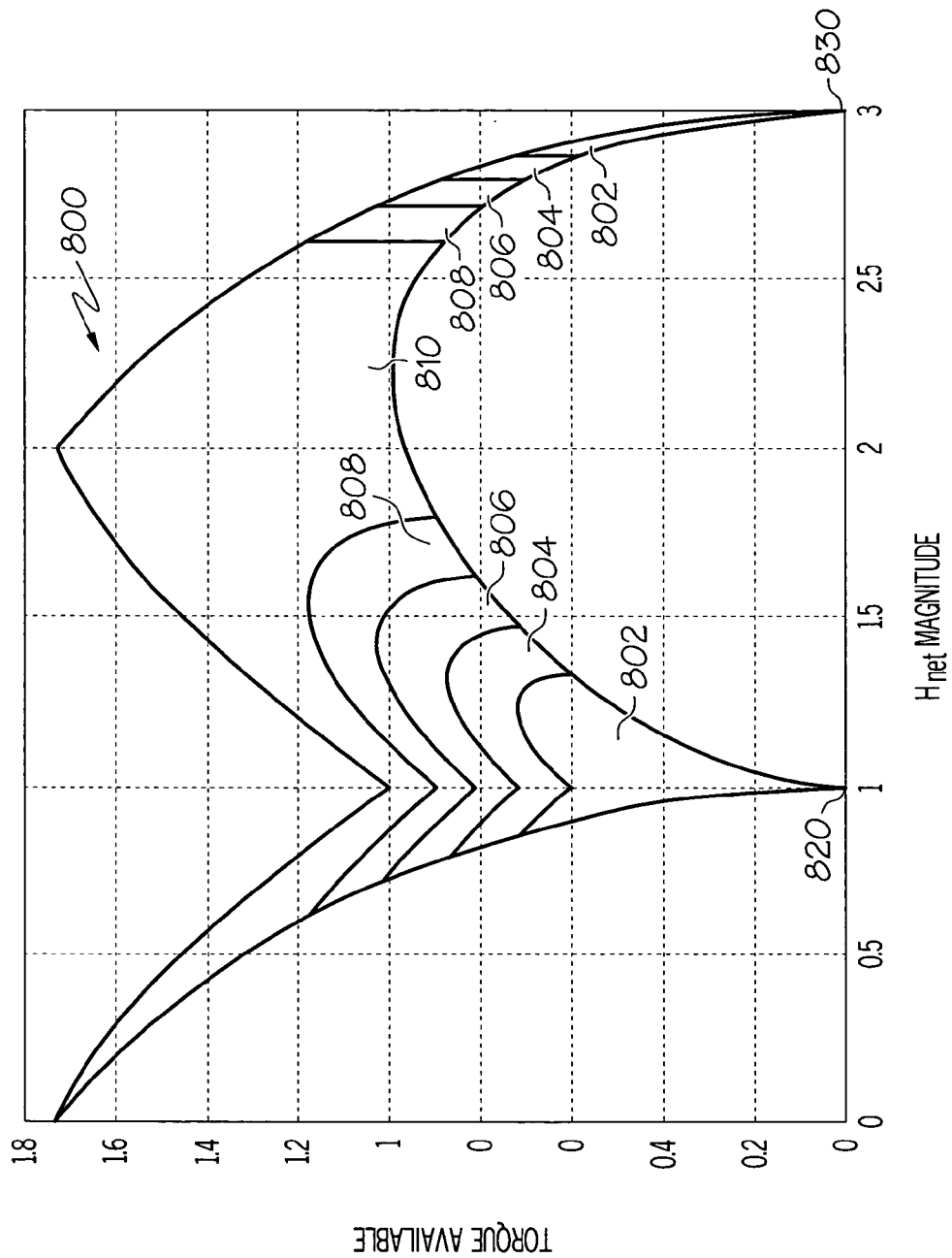
FIG. 8 is a graph illustrating an exemplary embodiment of the available torque in a system of three parallel CMGs under all possible gimbal angle sets in accordance with the teachings of the present invention.

FIG. 8 is a graph 800 that illustrates the available torque (in whatever direction that torque is smallest) in a system of three parallel CMGs 106 under all possible gimbal angle sets. All possible gimbal angle sets include the entire null space, not only the "ideal" gimbal angles. As shown in FIG. 8, the torque available, forms a band from the largest available torque (ideal gimbal angles) to the smallest torque (which goes to zero at singularity).

The regions 802-810 indicate the value of the determinant of the square matrix [$CC^T$], which is a strong indicator of a singularity. From region 810 to region 802, the determinant reduces. Note that at two points on the graph the torque (and determinant) goes to zero, illustrating singularity. These points occur at Hr=1 (internal singularity 820) and Hr=3 (saturation singularity 830), From this, the goals of null-space steering can be determined to be (1) encourage the system to stay near the upper end of the band as illustrated in FIG. 8, and (2) ensure that the system stay above some preset keep out zone in the band. The first goal is discretionary in that it should be accomplished with any extra available gimbal rate after the torque commands are met. The second goal, however, must be met, even at the expense of limiting the system torque.

In the background section it was discussed that generic control of an array of CMGs 106 requires a control matrix that is the inverse of a Jacobian matrix "C". The Jacobian matrix can be defined as:

$$C = \frac{\partial H}{\partial \theta} = \left(\frac{\frac{\partial H}{\partial t}}{\frac{\partial \theta}{\partial t}}\right) = \frac{\dot{H}}{\omega_{gimb}} \qquad \text{Eqn. 3}$$

and consists of the partial derivatives of the net momentum vector, H, with respect to θ. In the case of three parallel CMGs 106 having all its momentum in a disc, there are three values of θ, but the H vector is only 2-dimensional, therefore the C matrix is a 2×3. Obtaining the 3×2 control matrix for a non-square C requires a pseudo-inverse. As discussed previously, a simple Moore-Penrose pseudo-inverse can be used by assuming that the inverse will always be well-conditioned due to the singularity avoidance activity that will be going on in parallel. The pseudo-inverse gives:

$$C^+ = \frac{\omega_{gimb}}{\dot{H}} = \frac{\omega_{gimb}}{T} \qquad \text{Eqn. 4}$$

The 2 column vectors in this 3×2 matrix define the range space of the Jacobian, C. Any scalar multiple of the first vector of gimbal rates will produce torque in the X direction. Any scalar multiple of the second vector will produce torque in the Y direction.

A third vector of gimbal rates exists that produces no torque. This is the null space vector. It can be obtained, in one exemplary embodiment, through the use of singular value decomposition.

As discussed previously, for any position of net momentum in the disc, there is an "ideal" set of gimbal angles. These ideal gimbal angles are points in null space at which the maximum determinant and available torque occur (as illustrated in conjunction with FIG. 8). As discussed previously, ideal gimbal sets are characterized by one gimbal directed radially outward, and the other two making equal angles from the radial line. The half-angle between these two is directly a function of the radial distance from the origin, and can be shown to follow the relationship:

$$\theta = \frac{\pi}{2} - \sin^{-1}\left(\frac{1-|H|}{2}\right) \quad \text{Eqn. 5}$$

Figure 9:
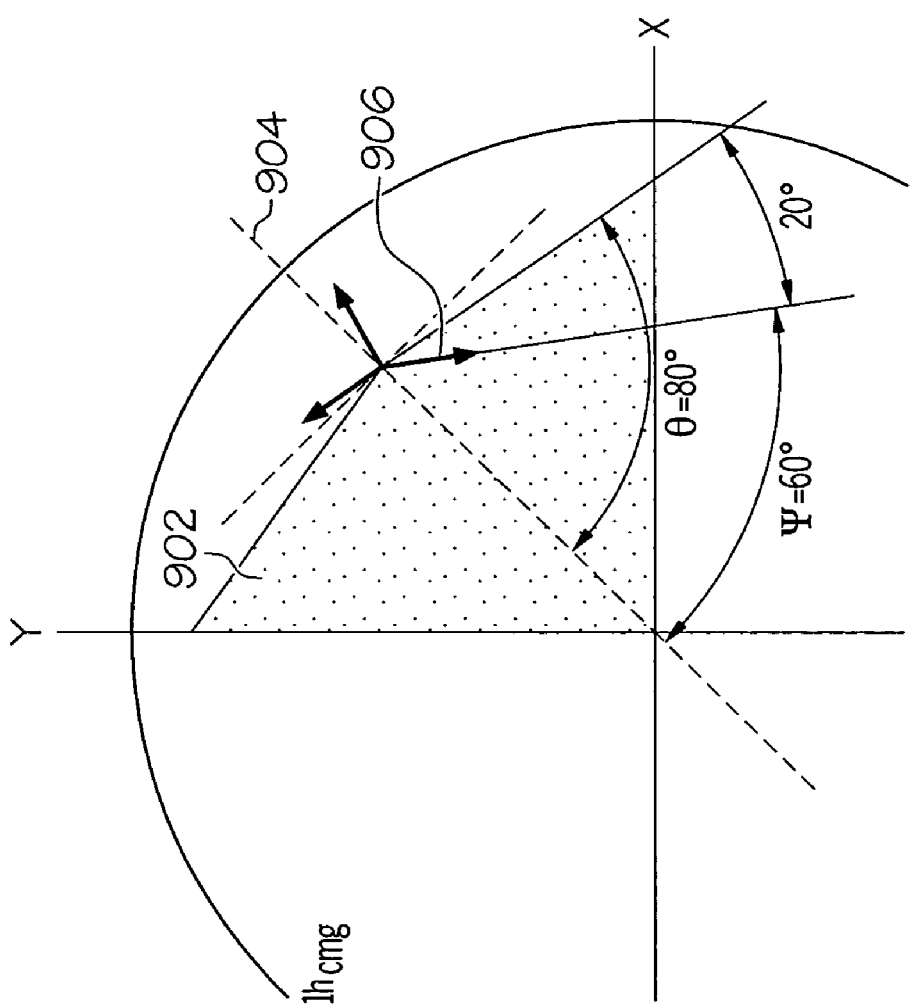
FIG. 9 illustrates an exemplary set of momentum vectors for three parallel CMGs deviating from an ideal configuration in accordance with the teachings of the present invention.

Eqn. 5 can be used to determine exactly how far a gimbal must move to arrive at the optimum point. This is illustrated in FIG. 9 which shows a set of momentum vectors for three parallel CMGs 106 deviating from an ideal configuration, an array at the point H=(0.46,0.46), with gimbal angles (−75°, 38°,126°). The magnitude of H is 0.65, and, from Eqn. 5, the half-angle θ is 80 degrees. This defines a keep out zone 902. The CMG 106 whose momentum vector is violating the keep out zone 902 can be determined along with the direction the momentum vector of the CMG 106 must move. An angle T can be determined as the angle between a radial line 904 and a momentum vector 906 of the CMG 106 violating the keep out zone 902. The CMG 106 corresponding to the momentum vector 906 is known as the violating CMG. The number of degrees needed to move the momentum vector 906 out of the keep out zone 902 can be determined by subtracting the angle Ψ from the half-angle θ (θ−Ψ=20°, in this example). Then, the gimbal rate necessary to move the violating CMG 106 in a given amount of time can be determined. If the movements of the CMGs 106 are restricted to null space motion as this gimbal is moved, the other two gimbals will end up at their ideal points as well.

Figure 10:
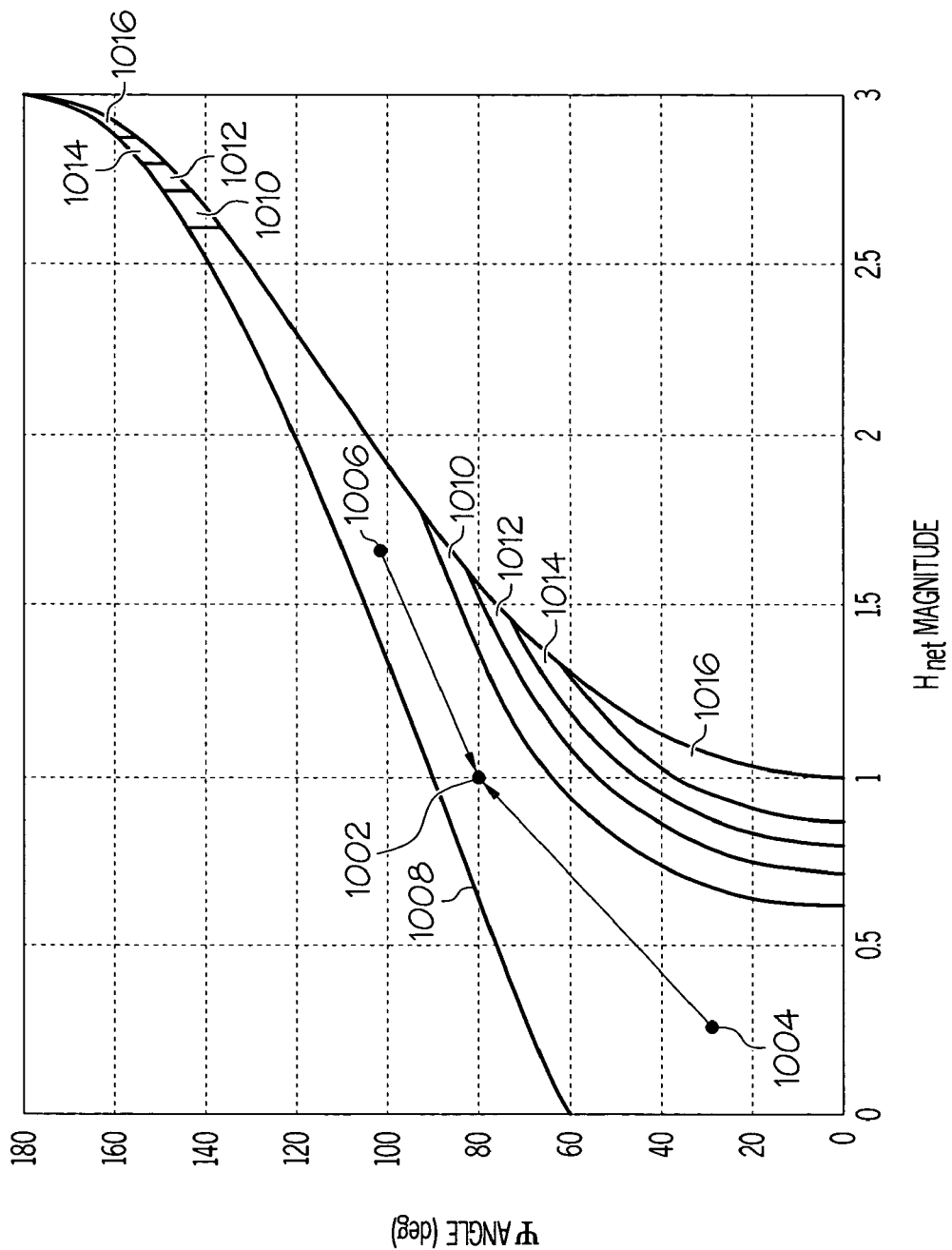
FIG. 10 is an exemplary embodiment of the extent of null space as viewed from the Hr-$\Psi$ frame with a limit point in accordance with the teachings of the present invention.

The angle Ψ defined above provides a means for quantifying how far a momentum vector of one of the CMGs 106 has moved from the ideal value (θ). FIG. 10 illustrates the extent of null space as viewed in the Hr-Ψ frame. The top of the band 1008 (optimum gimbal angles) is where the value of Ψ is equal to the value of θ as derived in equation (5). The different regions 1010-1016 shown correspond to different values of the determinant of the square matrix [$CC^T$], where the determinant reduces as we move toward 1016. In one exemplary embodiment, a criteria for singularity avoidance in this frame can be determined using a limit point 1002 at Hr=1, Ψ=80°. In one exemplary embodiment, all trajectories in Hr-Ψ space must pass over this limit point 1002. From any starting point in the space, such as a first starting point 1004 which is located inside the 1 h circle or a second starting point 1006 which is located outside the 1 h circle, as the radial component approaches Hr=1, a line from the first starting point 1004 or second starting point 1006 to the limit point 1002 can be defined such that the Hr-Ψ trajectory must not go below the line.

Imposing a trajectory, or slope, in the Hr-Ψ space can be accomplished by imposing a gimbal rate, ω, on the violating CMG 106. For the given torque command, the rate of change of radial momentum, $$\frac{dH_r}{dt}$$

can be determined and the slope of the line segment from the starting point 1004 to the limit point 1002 is $$\frac{d\Psi}{dH_r}.$$

Since the quantity Ψ is directly related to the gimbal angle:

$$\omega = \frac{d\Psi}{dt} = \frac{d\Psi}{dH_r}\frac{dH_r}{dt} \quad \text{Eqn 6}$$

The final step in the process is imposing the gimbal rate calculated above. Since the total gimbal rate commands are the range-space commands (torque commands) plus the null space commands (singularity avoidance commands), the null space action can be selected that produces the desired sum on the violating CMG. The gimbal rates determined are then checked to ensure that none of the three CMGs 106 are being commanded with rates outside their maximum capability. If they are, then the entire net vector must be scaled down. This results in a reduction in torque magnitude, but only the exact amount of reduction necessary to clear the limit point 1002.

Note that in the present invention, the limit point 1002 can be adjusted upward to provide greater margin for singularity avoidance or the limit point 1002 can be adjusted downward to provide smaller margin for singularity avoidance. Also, while only one limit point 1002 was shown in FIG. 10, multiple limit points 1002 can be determined, which then form multiple line segments that define a keepout zone for null space maneuvers to avoid singularities with some predetermined margin.

In addition to the above described maneuvers used to avoid singularities, null space movements can also be made to make more torque available. Recall that in FIG. 10 the different regions 1008-1016 correspond to the determinant of the square matrix [$CC^T$]. Region 1008 has the greatest determinant value while region 1016 has the lowest determinant value. The strategy to improve the overall condition of the CMG array is to make null space maneuvers that result in a larger value for Ψ, which is equivalent to moving upward on the graph to a region with a larger determinant value.

These adjustments can be made if any gimbal rate remains available after the commanded torque is provided along with the required singularity avoidance.

Figure 11:
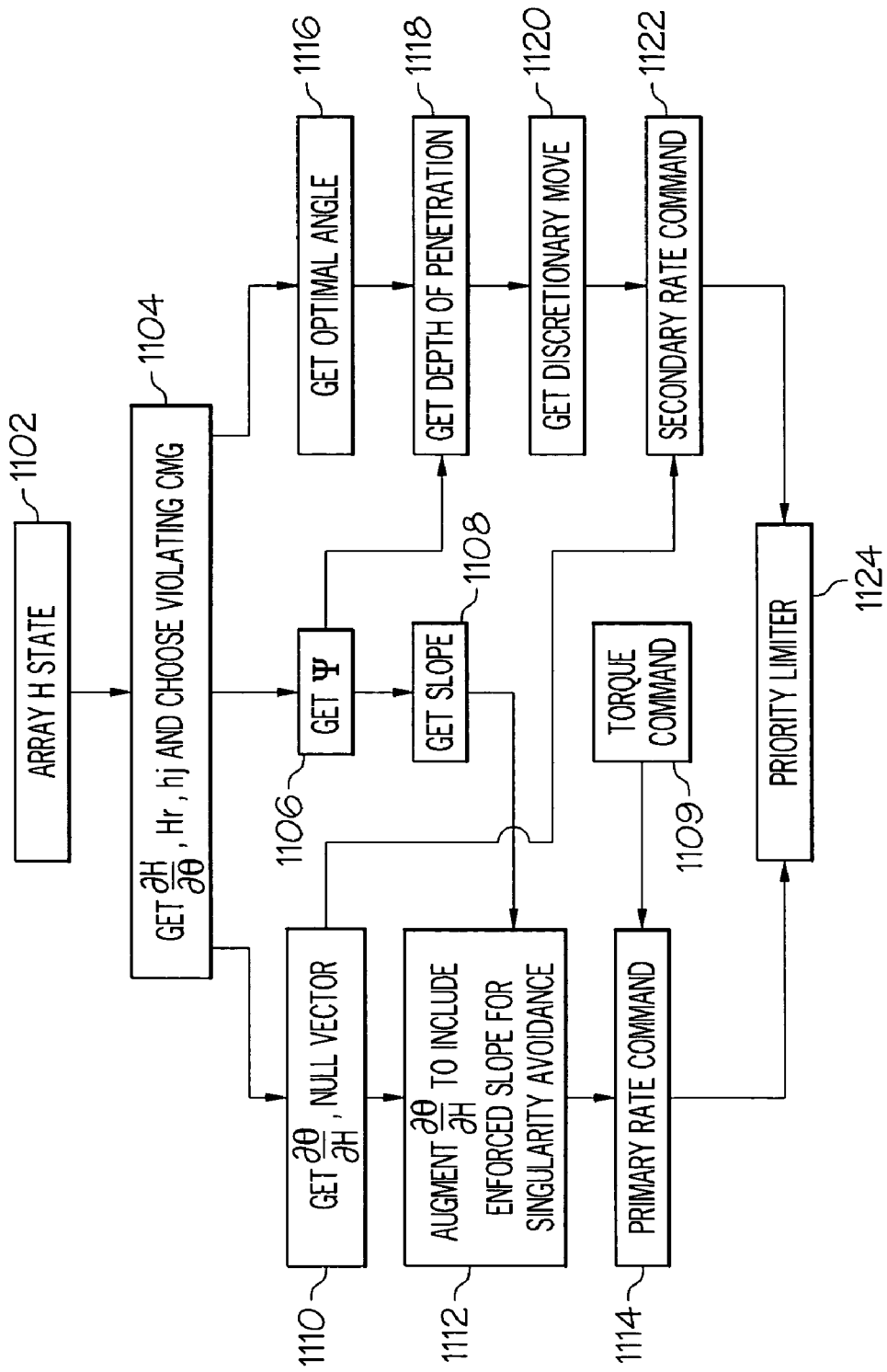
FIG. 11 is a flowchart illustrating a method for determining mandatory and discretionary CMG movements to avoid singularities and to maximize available torque in accordance with the teachings of the present invention.

FIG. 11 illustrates a method for determining mandatory and discretionary CMG 106 movements to avoid singularities and to maximize available torque. In a first step, step 1102, the momentum state of the CMG 106 array is determined.

Next, in step 1104, from the current state of the array, $$\frac{\partial H}{\partial \theta},$$

the radial momentum vector, Hr, and the unit momentum vector, $h_i$, for each CMG 106 are determined. Also, the violating CMG 106 as discussed previously is determined.

After step 1104, the discretionary movements are determined in step 1116-1122 and mandatory movements are determined in step 1110-1114. Also, preliminary calculations are made in steps 1106 and 1108.

In step 1106, the angle Ψ is determined. As previously discussed, Ψ is the angle between the radial line of the optimal CMG 106 alignment and the momentum vector 906.

In step 1108, a slope for the maneuver is calculated that clears the boundary that defines the singularity avoidance criteria. As discussed previously, the boundary represents lines below which the angle Ψ must not fall when the CMGs 106 are moving to provide torque.

Turning first to the discretionary movements, in step 1116, the optimal angle for the present position of the CMG 106 is calculated from:

$$\theta = \frac{\pi}{2} - \sin^{-1}\left(\frac{1-|H|}{2}\right) \qquad \text{Eqn. 7}$$

In step 1118, the depth of penetration is determined. The depth of penetration represents how far the unit vector for the violating CMG 106 is within the keep out zone 902. This can be calculated by subtracting the optimal angle, θ, from Ψ.

In step 1120, discretionary movements are determined. As discussed previously, discretionary movements, for a given momentum magnitude, increases the Ψ value to improve the overall condition of the system. This increases the torque available in the system but is not sufficient for singularity avoidance. In one exemplary embodiment, the gimbal rate to implement the movement is determined by using the depth of penetration of the momentum vector 906 of the CMG 106 that is in the keep out zone 902. By reducing the depth of penetration, Ψ is increased and the overall condition of the system, in terms of available torque, is increased.

In step 1122, secondary gimbal rate commands for each of the gimbals of the CMGs 106 are determined for the discretionary movements as calculated in step 1120.

Turning to the mandatory movements, in step 1110, the $$\frac{\partial \theta}{\partial H}$$

and the null vector are determined. The inverse of the Jacobian matrix, determined as discussed previously, using the Moore-Penrose pseudo-inverse, is $$\frac{\partial \theta}{\partial H},$$

which in an exemplary embodiment, is a 3×2 matrix. The null vector is the vector of gimbal rates that produce no torque.

After the slope for the maneuver is determined in step 1108 that clears the boundary, in step 1112 the movements of the CMGs 106 are required to follow the determinant slope. In other words, the slopes calculated in step 1108 are imposed as criteria for null space movement.

In one exemplary embodiment, a simple inverse-Jacobian control matrix can be augmented to impose the calculated slope in the Hr-Ψ plane (the mandatory null space maneuver) to form an augmented control matrix. Note that it is important to recall that the imposed slope action is limited solely to radial motion. When moving tangentially in the disc, Hr does not change, and there should be no motion in the Hr-Ψ plane. Based on the relationship of equation 6, values $k_{rad}$ and $k_{tang}$ can be computed at each gimbal state that accomplish the goals of this paragraph as follows (polar coordinates).

$$\omega_{net} = C\begin{bmatrix} T_{rad} \\ T_{tan\,g} \end{bmatrix} + \omega_{null}[\,k_{rad}\ \ k_{tan\,g}\,]\begin{bmatrix} T_{rad} \\ T_{tan\,g} \end{bmatrix} \qquad \text{Eqn. 8}$$

$$\omega_{net} = C'\begin{bmatrix} T_{rad} \\ T_{tan\,g} \end{bmatrix}$$

-continued where $C' = C + \omega_{null}[\,k_{rad}\ \ k_{tan\,g}\,]$

In step 1124, the primary rates determined in step 1114 are limited without changing the direction of the rate vectors based on overall system characteristics, such as limits on the gimbal rates. Additionally, the secondary rates for discretionary null space movements can be added to the primary rates up to the rate limit for the CMG 106.

While an exemplary embodiment of a set of six CMGs configured as a "roof" array has been discussed, the teachings of the present invention are applicable to other arrangements and numbers of CMGs that can navigate in null space.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for avoiding singularities in the movement of a set of control moment gyroscopes (CMGs) configured to allow null space maneuvering comprising:
   determining a mandatory null space maneuver to avoid singularities; and
   determining an optional null space maneuver to increase available torque.

2. The method of claim 1 further comprising implementing the mandatory null space maneuver by augmenting an inverse-Jacobian control matrix.

3. The method of claim 1 wherein the step of determining the mandatory null space maneuver is based on the gimbal angle of one or more violating CMGs.

4. The method of claim 1 wherein the step of determining the mandatory null space movement further comprises:
   determining a boundary in a Hr-Ψ frame comprising one or more line segments;
   determining a slope for the maneuver that clears the boundary; and
   imposing the slope for the mandatory null space movement.

5. The method of claim 4 further comprising the step of adjusting the boundary to provide adjustable margin for avoiding singularities.

6. The method of claim 1 wherein the step of determining an optional null space maneuver to increase available torque further comprises adjusting the gimbal angle of a violating CMG to reduce the depth of penetration into the keep out zone.

7. A control system for adjusting the attitude of a spacecraft comprising:
   a set of control moment gyroscopes (CMGs) configured to allow null space maneuvering; and
   a momentum actuator control processor coupled to the set of CMGs and configured to determine a mandatory null space maneuver to avoid singularities and determine an optional null space maneuver to increase available torque.

8. The system of claim 7 wherein the mandatory null space maneuver is implemented by augmenting an inverse-Jacobian control matrix.

9. The system of claim 7 wherein the mandatory null space maneuver is based on the gimbal angle of one or more violating CMGs.

10. The system of claim 9 wherein the momentum actuator control processor is further configured to:
   determine a boundary in a Hr-$\Psi$ frame comprising one or more line segments;
   determine a slope for the maneuver that clears the boundary; and
   imposing the slope for the mandatory null space movement.

11. The system of claim 10 further comprising the step of adjusting the boundary to provide adjustable margin for avoiding singularities.

12. The system of claim 7 wherein the momentum actuator control processor is further configured to:
   determine an optimal angle;
   determine a first angle between a radial and a momentum vector of a violating CMG within a keep out zone;
   determine a second angle as the distance between the optimal angle and the first angle, the second angle representing a depth of penetration of the momentum vector of the violating CMG into the keep out zone; and
   adjust the violating CMG to reduce the depth of penetration into the keep out zone.

13. A control system for adjusting the attitude of a spacecraft comprising:
   a set of control moment gyroscopes (CMGs) configured to allow null space maneuvering;
   a momentum actuator control processor coupled to the set of CMGs and configured to determine a mandatory null space maneuver to avoid singularities and determine an optional null space maneuver to increase available torque; and
   an attitude control system coupled to the momentum actuator control processor, the attitude control system further configured to generate torque commands from received requested spacecraft maneuvers.

14. The system of claim 13 wherein the mandatory null space maneuver is implemented by augmenting an inverse Jacobian control matrix.

15. The system of claim 13 wherein the mandatory null space maneuver is based on the gimbal angle of one or more violating CMGs.

16. The system of claim 13 wherein the momentum actuator control processor is further configured to:
   determine a boundary comprising one or more line segments;
   determine a slope for the maneuver that clears the boundary; and
   imposing the slope for the mandatory null space movement.

17. The system of claim 13 wherein the momentum actuator control processor is further configured to:
   determine an optimal angle;
   determine a first angle between a radial and a momentum vector of a violating CMG within a keep out zone;
   determine a second angle as the distance between the optimal angle and the first angle, the second angle representing a depth of penetration of the momentum vector of the violating CMG into the keep out zone; and
   adjust the momentum vector to reduce the depth of penetration into the keep out zone.

* * * * *